(12) United States Patent
Sukhodolov et al.

(10) Patent No.: US 10,452,907 B2
(45) Date of Patent: Oct. 22, 2019

(54) SYSTEM AND METHOD FOR GLOBAL IDENTIFICATION IN A COLLECTION OF DOCUMENTS

(71) Applicant: ABBYY Production LLC, Moscow (RU)

(72) Inventors: Dmitry Sukhodolov, Moscow Region (RU); Stepan Matskevich, Moscow Region (RU); Anatoly Starostin, Moscow (RU)

(73) Assignee: ABBYY Production LLC, Moscow (RU)

(*) Notice: Subject to any disclaimer, the term of this patent is extended or adjusted under 35 U.S.C. 154(b) by 0 days.

(21) Appl. No.: 16/005,327

(22) Filed: Jun. 11, 2018

(65) Prior Publication Data

US 2018/0330157 A1    Nov. 15, 2018

Related U.S. Application Data

(63) Continuation of application No. 14/714,556, filed on May 18, 2015, now Pat. No. 9,996,742.

(30) Foreign Application Priority Data

Mar. 19, 2015    (RU) .............................. 2015/109664

(51) Int. Cl.
*G06F 17/00*   (2019.01)
*G06K 9/00*   (2006.01)
*G06K 9/62*   (2006.01)

(52) U.S. Cl.
CPC ....... *G06K 9/00469* (2013.01); *G06K 9/6215* (2013.01)

(58) Field of Classification Search
CPC .......... G06F 21/35; G06F 21/60; G06F 21/78; G06F 2221/2105; G06F 17/30551; G06F 17/241
USPC ........................................................ 707/704
See application file for complete search history.

(56) References Cited

U.S. PATENT DOCUMENTS

| 7,966,291 | B1 | 6/2011 | Petrovic et al. |
| 8,538,904 | B2 | 9/2013 | Fokoue et al. |
| 2007/0269107 | A1* | 11/2007 | Iwai .................. G06K 9/50 382/168 |
| 2012/0310916 | A1 | 12/2012 | Abadi et al. |

* cited by examiner

*Primary Examiner* — Truong V Vo
(74) *Attorney, Agent, or Firm* — Lowenstein Sandler LLP

(57) ABSTRACT

Techniques for machine-based identification of objects extracted from text documents in natural language are disclosed. An example method may comprise: identifying matching pairs of one or more information objects corresponding to a real world object, one information object from the document and at least one information object from the document storage for a combination of global identification patterns that exist in the document and in the document storage; ascertaining consistency of the matching pairs and determining which of the one or more information objects in the document are suitable for merging into the document storage; and adding the one or more information objects from the document to the document storage to associate information objects corresponding to the real world object.

20 Claims, 8 Drawing Sheets

SYSTEM AND METHOD FOR GLOBAL IDENTIFICATION IN A COLLECTION OF DOCUMENTS

CROSS REFERENCE TO RELATED APPLICATIONS

This application is a continuation of U.S. application Ser. No. 14/714,556, filed May 18, 2015, and claims the benefit of priority to Russian Patent Application No. 2015/109,664, filed Mar. 19, 2015; disclosure of which is incorporated herein by reference in its entirety.

FIELD OF THE INVENTION

The present disclosure relates to the field of machine processing of natural language and identification of information in text documents.

BACKGROUND OF THE INVENTION

When working with a collection of documents, it is often necessary to search for the desired information in the collection. Search results for information of interest may be generated by search engines using keywords entered by a user as a search query. Existing search systems enable users to use simple query languages to find documents that either contain or do not contain the words or word combinations specified by the user.

The search of information in numerous and heterogeneous text resources inevitably meets the facts that the same event, object, person is expressed in various documents by a different way using various words, expressions, notations etc. For example, a system of information extraction should understand that "Winter Olympics 2014", HarrpHMep, rrporpaMMa H3BJieqeHH51 HHQ:>opMa:o;HH,ll;Omrma rroHHMaTh, qTo "Olympic Games in Sochi", "Olympics in Sochi" etc. correspond to the same event, as well as "Yuri Gagarin", "first cosmonaut of the Earth", "first soviet cosmonaut" refer to the same person.

In order to increase the reliability and completeness of such searches and state that, for example, two objects from two different documents correspond to the same real world object, identifying features of such objects need to be determined or known. Still, even if some unique identifying features are determined for two objects, those objects can turn out to be different, such as complete namesakes.

Special models of presenting data, such as Resource Description Framework (RDF) are used to store information of objects in a collection of documents. RDF is a graph structure presenting a set of statements about entities, which are the real world objects (such as people, organizations, location), as well as facts (such as the fact of a person working at a particular organization). Each statement is presented in the form of three data entities (subject, predicate, object} and it is called a "triplet". A plurality of statements—triplets form a graph with its nodes corresponding to objects and subjects linked by arcs—predicates directed from subjects to objects. Such RDF graphs can be constructed for one sentence as well as for the entire document in the collection of documents.

Each real world object in the collection is associated with one or more features of an RDF graph, and different copies of the same real world object in different documents can be characterized by the same features. Therefore, the task of global identification consists in comparing objects from texts in a natural language with each other and with real world objects and in creating RDF-graph and at one or more index of the document collection as different objects with identical features are represented in the RDF graph as the same object.

SUMMARY OF INVENTION

According to the present invention, a method of machine-based identification of one or more objects in a document and in a document storage, the objects corresponding to the same real world object, comprises: (a) searching for global identification patterns and a combination of the global identification patterns in the document; (b) searching for the same global identification patterns and their combinations in the document storage; (c) finding matching pairs of the combination of the patterns for said one or more objects from the document and from the document storage; (d) ascertaining consistency of the matching pairs and deciding which said one or more objects in the document can be merged with that in the document storage; and (e) adding the one or more objects in the document to the document storage. It is contemplated by the present method that step (e) further comprises adding one or more feature of said one or more information object of the document to the document storage if said one or more feature is absent from the document storage and if said one or more information object in the document and in the document storage corresponds to the same real world object.

It is also contemplated by the inventive method that step (e) further comprises adding one or more information object from the document to the document storage as a new information object if said one or more information object in the document storage does not have one or more information object in the document storage corresponding to the same real world object.

The method contemplates that the global identification patterns correspond to features of real world objects. The document and the document storage are presented in a form of an RDF graph.

The method also contemplates that a computer language SPARQL is used for communicating with the document storage. Additionally, ascertaining consistency of the matching pairs further comprises ascertaining cardinality of features of said one or more objects.

Various other aspects and embodiments of the disclosure are described in further detail below. It has been contemplated that features of one embodiment of the disclosure may be incorporated in other embodiments thereof without further recitation.

The Summary is neither intended nor should be construed as being representative of the full extent and scope of the present disclosure. All objects, features and advantages of the present disclosure will become apparent in the following detailed written description and in conjunction with the accompanying drawings.

The novel features believed being characteristic of the description are set forth in the appended claims.

Figure 1:
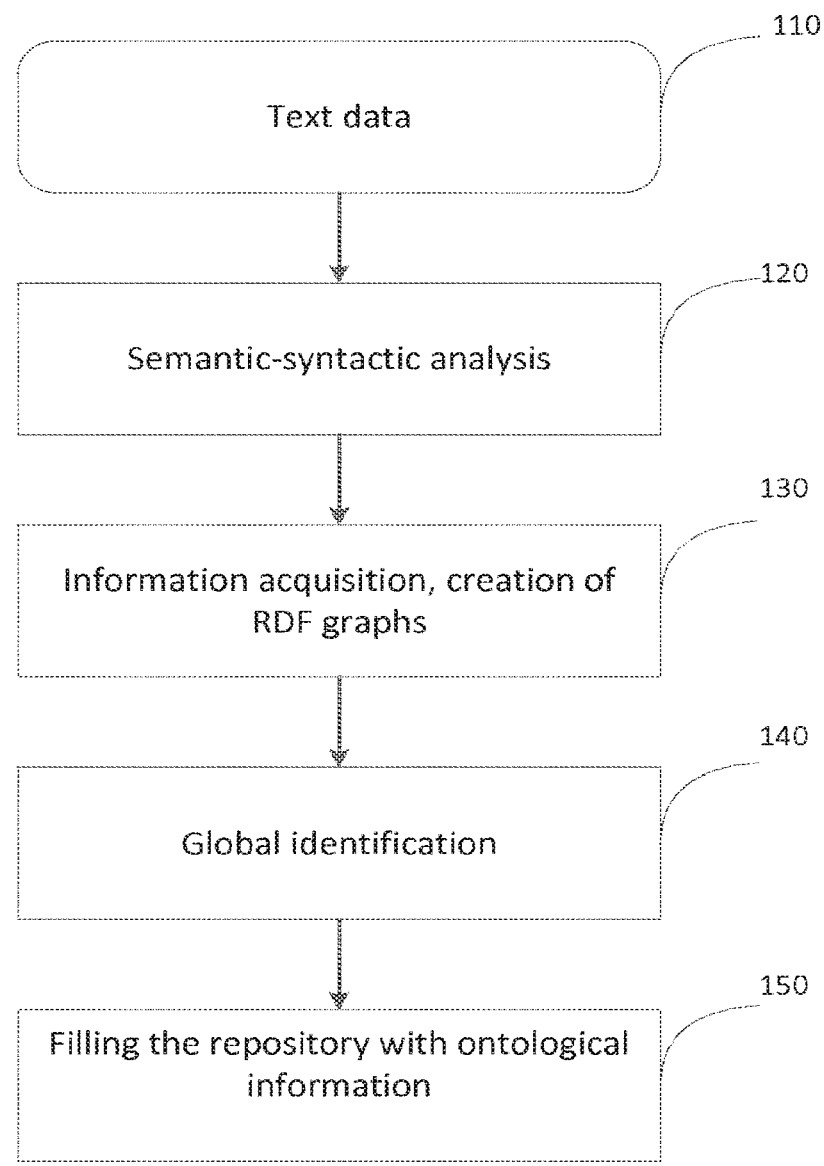
FIG. 1 illustrates a general information extraction process in accordance with one example aspect of the invention.

The images in the drawings are simplified for illustrative purposes and are not depicted to scale.

To facilitate understanding, identical reference numerals are used in the drawings to designate, where possible, substantially identical elements that are common to the figures, except that alphanumerical extensions and/or suffixes may be added, when appropriate, to differentiate such elements.

DETAILED DESCRIPTION OF THE INVENTION

Objects, features and advantages of the present disclosure are discussed below in reference to machine-based semantic identification of searched information in collections of text documents available, in an electronic form, in one of natural languages.

It has been contemplated that at least portions of the present invention may also be utilized for analysis of other types of documents (e.g., multi-language documents, etc.). We distinguish objects of real word and their mentions, names, references to them in texts in a natural language, that we call information objects.

Global identification in a collection of documents is a merging information objects related to the same object of real world in process of extracting information from a text (or corpus of texts) written in a natural language to merge RDF graphs of numerous documents into one common RDF graph by merging matching objects. In one embodiment, for accomplishing such goal a merger of information from a large selection of documents by running a global identification process for each document and successively comparing all documents among each other is applied. That process continues until the last pair of information objects is merged into the common RDF graph. Another possibility is merging the information objects by successively adding information objects from a new document to a storage. In order for the referenced merger to be effective, information from the documents need to be stored as special structures—RDF graphs.

Global identification consists of associating the information objects from the document with information objects already contained in the storage and merging identical information objects. Because the information about the objects is represented as a graph, global identification task may be alternatively formulated as a task of search for identical subgraphs in the RDF graphs of the document and the storage.

Global identification is implemented with the help of global identification patterns. The SPARQL language is used to define patterns. A single pattern and is responsible for only one of an information object's features. Therefore, reliable identification generally uses combinations of patterns. For example, the pattern combination <"First name", "Surname"> is used to identify an information object with type "Person". A combination may consist of an arbitrary number of patterns. All global identification patterns are contained in a special library. It is structured so that patterns designed to identify various objects in the real world are stored separately from each other.

Different combinations can have different combination reliability, which is determined by three parameters. The first parameter is the weight which reflects how precisely the combination can identify objects. The weight ranges from 0 to 1. The closer it is to 1, the more probable it is that two objects correspond to the object/entity of the real world. The other two parameters are the unicity parameter and the specialty parameter. The specialty parameter indicates how many different values a combination has, the unicity parameter indicates how frequently different objects are characterized by the same combination value. The second and third parameters range from 0 to 1. If unicity is equal to 0, it means that the object has more than one feature. If specialty is equal to 0, it means that there is more than one object with that one feature. And vice versa, of unicity and specialty are equal to 1, then the feature of an object has only one value and there is only one object with that feature. For example, a combination <"first name", "Surname"> has low combination reliability, because there can be many different people with the same first names and Surnames, but a combination <"first name", "middle name", "Surname"> will have a higher combination reliability, because complete namesakes are rare.

In one embodiment the reliable combinations is defined with the help of one or more classifiers. The classifiers are trained on a tagged corpus of texts, storing combinations of patterns that were used for merging information objects. The result of the classifier training is a set of combinations.

In one embodiment one or more linear classifiers are used. The classifiers output a set of coefficients—the weights bound to the patterns of global identification. Then, during the global identification for each information object the classifier can identify sets of patterns with the sum of weights exceeding a predetermined threshold, and determine such sets as combinations to be used for merging information objects.

Each pattern always contains variables this and that, called allocated variables. Variable this is the name for an identifiable information object. Variable this corresponds to an information object from the document, which is a merger candidate. Variable that is the name of an identifying information object (or the value of the feature). After comparing the patterns with the graph, variable that may correspond to either to an information object from the document or to a value of a simple property (a line, number or Boolean true/false) according to which the process of global identification will be accomplished. The value corresponding to that is called the value of the pattern for the given object.

In addition to this and that variables pattern may comprise local variables. These local variables define information objects, through which in RDF-graph of the document the identifiable information object (this) is linked with the identifying information object (that). If it is possible to find a group of information objects in the document, such that after the variables in the pattern are substituted for the objects of this group, the resulting substitution matches a subgraph of RDF-graph of the document, then the pattern is considered to be realized (or executed) in this document. The result of the searching and realizing of global identification patterns in the RDF-graph of document is a list of triples <this, that, pattern>, which are called matchings. Instead of this—variable in the list identifiers of information objects—candidates for merging are located, instead of that-variable identifiers of information objects are located or identifiers of specific values of simple properties (string, number, Boolean), depending on the feature specified in the pattern may be located.

Collections of documents, or, more specifically, their RDF graphs, are stored in a storage. Before the document enters the storage, the information must be extracted from the text and represented using a special data structure that enables rapid searching of the information and also allows it to be stored compactly. Moreover, the information extraction process itself represents a complex technical task, which for the purposes of the present invention is performed using a system of production rules that are in turn applied to structures resulting from a complete semantic-syntactic analysis.

The main steps of the method being described are outlined in FIG. 1. At step 110 text data (with or without markup) are provided into the system. It is subject to semantic and syntactic analysis at step 120. A commonly owned U.S. Pat. No. 8,078,450 describes a method that includes deep syntactic and semantic analysis of natural language texts based on exhaustive linguistic descriptions. The method uses a broad range of linguistic descriptions, such as universal semantic mechanisms associated with a specific language, which allows all the real complexities of the language to be reflected without simplification or artificial limits, without any danger of unmanageable growth in complexity. In addition, these analytical methods are based on principles of holistic goal-oriented recognition, i.e., hypotheses about the structure of a portion of a sentence are verified as part of checking the hypotheses about the structure of the entire sentence. That makes it possible to avoid analyzing a large set of anomalies and variations. The semantic and syntactic analysis will be described in more details below.

The results of the complete semantic and syntactic analysis are then used in the information extraction process at step 130, from which an RDF (Resource Description Framework) graph is generated. The information extraction module processes a forest of semantic-syntactic trees, one tree for each sentence of the source text. In accordance with the RDF concept, the extracted data is represented as a set of <subject, predicate, object> (<s, p, o>) triplets. The subject is some entity, or information object, that represents an object in the real world. The predicate is a certain feature that describes the subject. There are two types of predicates (features): attributes and relations. An attribute is a non-object feature with the value of a simple data type: string, integer, or Boolean value. A relation is an object feature having a value, which is another information object that represents a different entity in the real world. An object is therefore a given predicate's value for a given subject and may be either a simple data type (integer, string, etc.) or the identifier of a different information object. There are various types of information objects, for example: Person, Location, Organization, Employer etc. All RDF data extracted from text conforms to a model of the domain (the types of information objects match concepts from an appropriate ontology) within which the information extraction module is running.

To add the information extracted from documents to the storage, global identification at step 140 may be performed. Its purpose is to join the RDF graphs of separate documents into one common graph, while merging information objects that represent the same object in the real world.

The global identification process concludes by importing the data derived from a new document into the storage of ontological data at step 150.

Figure 2:
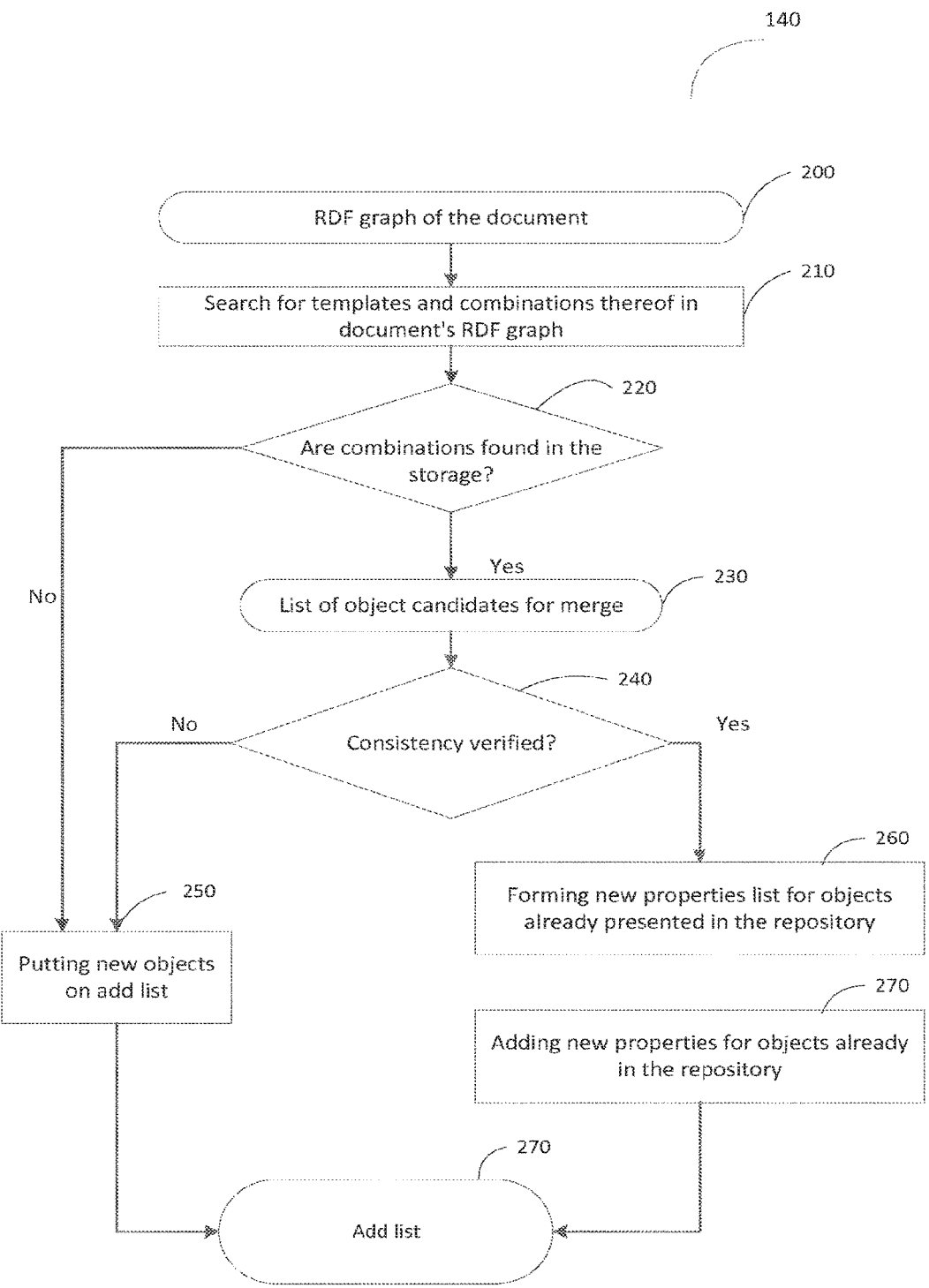
FIG. 2 is an illustration of a global identification process in accordance with one example aspect of the invention.

FIG. 2 outlines the global identification process. In the method being described, the global identification mechanism is a step-by-step process. In other words, identification is executed sequentially for each new document added to the storage which contains a collection of documents that the identification process has already been run on.

An RDF-graph of the document 200 is an input for the global identification process (wherein we assume that object identification has been performed within some document and that all information objects in the graph are different). In the first stage of the identification process, a search is launched for known patterns and combinations of known patterns 210 in the RDF-graph of the document 200. Then the storage is also searched 220 for the corresponding patterns and combinations. If corresponding patterns and combinations are found, then a list of information objects that are candidates for a merge 230 is generated. These candidate information objects are tested for consistency 240. Consistency means that merging the information objects does not violate the cardinality of their relations (consistency with the ontology is not violated). If a pair fails the test, then the identification process returns to step 220. If the list passes the consistency test 240, it means that the information object from the document is already contained in the storage and all of the information object's new features extracted from the document are added 260 to the add list 270. During the step 220, if combinations found in the RDF-graph of the document do not have corresponding combinations in the storage, it means that the document contains new information objects and these new information objects are to be added to the add list 250. In the last step, the add list 270 is formed. It contains the new information objects from the document and the new features of the objects, already existing in the storage.

Figure 3:
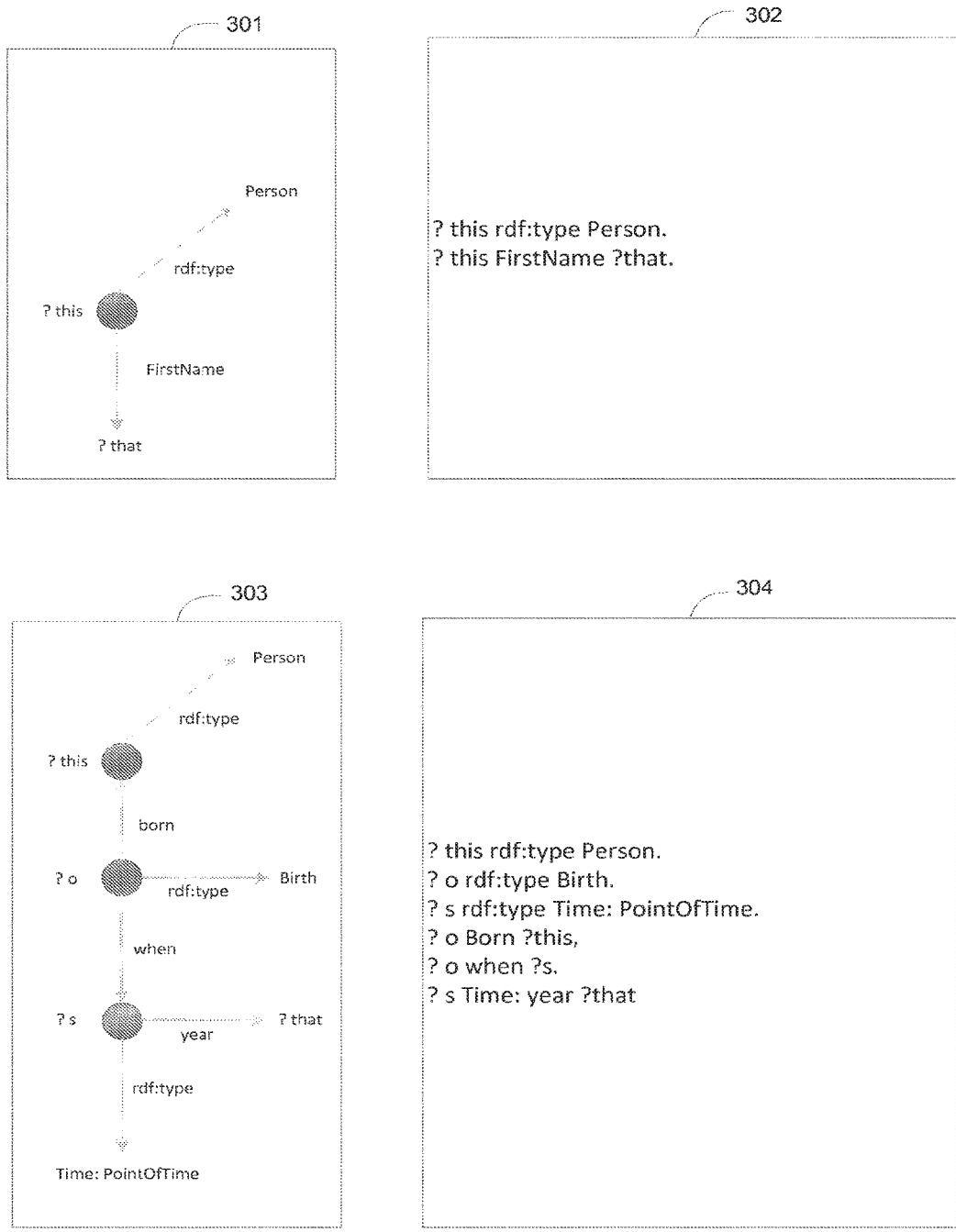
FIG. 3 is an example of a global identification pattern according to an embodiment of the present invention.

Examples on FIG. 3 describe in more details pattern of global identification. Pattern A defines the feature of information object with type <Person> "to have a specific name". Pattern has graph representation 301 and triplet representation 302. For description of this feature, it is sufficient to specify the type of information object (rdf: type <Person>) and non-object feature FirstName. The dashed arrows correspond to non-object features (attributes), the direction of the nominate arrow is defined from the subject "s" to the object "o" of the triple, name of arrow corresponds to the predicate "p".

Template B is more complex, it defines the feature of information object of type <Person> "to be born in a given year". This template also has graph representation 303 and triplet representation 304. Information object of type <PointOfTime>, which specifies the year, is not directly linked to the information object of type <Person> but through the fact of birth (<Birth>). This fact in RDF-graph is represented as a separate information object. Thus, for a description of this feature one should specify information objects of types <Person>, <PointOfTime> and <Birth>, object relations between them, and attributes for each of the information objects. Filled arrows on the graph representation 303 correspond to the object relations, dotted arrows correspond to non-object relations. The direction of the arrow is given from the subject "s" to the object "o", the name of the arrow corresponds to the predicate "p".

Figure 4:
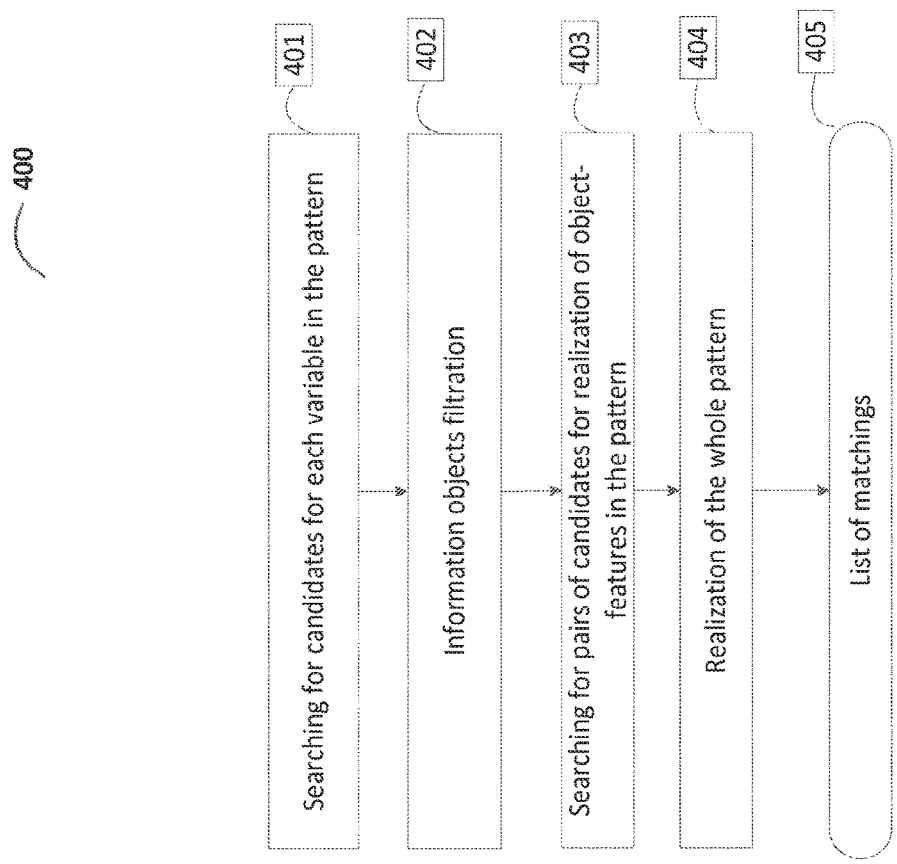
FIG. 4 is a block diagram illustrating a search for a pattern in a graph of a document according to an embodiment of the present invention.

FIG. 4 is a block diagram 400 illustrating a search for a pattern in a graph of a document. The process of searching for the pattern in a graph of a document 400 begins with selection 401 of a candidate information object for each variable of the pattern. Only those information objects whose sets of concepts contain all concepts specified for the variable can be considered as candidates for the variable of the pattern. The information object can have several concepts, i.e. several roles in different ontologies at the same time. After we chose a plurality of information objects from a plurality of selected candidates for the position of each variable, it is necessary to filter candidates 402. During filtration those information objects that don't satisfy the non-object features defined in the pattern are removed from the list of candidates for the pattern and discarded. After that the search of pairs consistent with the object features of the pattern 403 is implemented among the remaining pairs of information objects. Object features are defined by triplets of patterns in which subject and object are both information objects. Thus, we look for such pairs of information objects "s" and "o" that have the subject "s" in the set of candidates for the subject-variable and the object "o" in the set of candidates for the object-variable. From these pairs only those which have an arc in the graph of the document corresponding to the relation of the triplet are saved.

Then we realize the entire pattern 404 by identifying a path from the variable that to the variable this in the graph of the document. First, we identify all candidates for variable this. Then, for each of the identified candidate we look for a candidate for a neighbor variables (neighbor variable is a variable which is connected to the considered variable with a single arc). Then we look for the neighbors of the neighbors, and so on until there are no more candidates for neighbor variables or until a conflict is found. If no conflict is identified, than the pattern is fully realized, and we save all sets of objects that fall under this and that variables simultaneously. All such triples <this, that, the pattern> are combined into a list of matchings 405.

After all possible patterns of identification are found in the graph of the document, for this-objects of matchings we search for objects for which the complete combination is realized. The combination is realized when all of the patterns that are included in it are realized. After that, all matching for all combinations are collected and stored.

Referring to FIG. 4 it should be mention that it is possible in one pass to find and store information objects in the documents that are candidates for a merge, while, to implement search for these objects in a storage is not so simple. Suppose you want to identify a person by an attribute "works at company N». <Organization> in the RDF-graph is a complete information object, and a variable that in the pattern gets information object-organization from the document. Also there are attributes for the organization (company) itself, for example, its full name or business address. And as long as the organization in the storage is not recognized as the one that is cited in the document, we cannot identify a man working in the organization. Thus, you need at least two cycles to search the storage and import the objects: first for identification of the organization, and second for identification of its employees. Such data processing method is called cascade.

The need in implementing cascade global identification can arise only for the patterns, in which the variable that must be replaces by an information object. If this information object is not identified, the object that replaces this-variable also cannot be identified, because, in fact, there is no identifier, or in other words, its value does not exist.

When an information object is added to the storage, a number identifier is assigned to it. In one embodiment, the storage contains tables of searching indexes that facilitate searching (i.e. iterating) as described below:

(a) double index <subject(s), document (d)>. For each information object, this index makes it possible to view a list of documents that contain it. A search of documents containing a sought-after information object may be conducted efficiently thanks to the fact that all pairs <s, d> for the sought after s are arranged sequentially in the table;

(b) triplet index <subject (s), predicate (p), object (o)>: <s, p, o>;

(c) quad index <document (d), subject (s), predicate (p), object (o)>, i.e. for each document the list of triplets extracted from that document is stored.

The tables contain identifiers of the concepts, predicates, information objects, documents, and simple property values. Concept and predicate (attribute and relation) identifiers may be assigned when defining a specific domain. In one embodiment, an information object's identifier is assigned when a new node is added to the storage's RDF graph (i.e. it is the information object's index number in the storage). A document's identifier is also assigned when the document is added to the storage. Simple property identifiers are identifiers of strings and numbers. String identifiers are computed using a special data structure called a trie. With a trie, a string may be used to quickly get its identifier and search for triplets where it is object's value. Number identifiers may also be computed and stored using a trie (a binary tree having a key for each of its nodes). Objects have their own UR is that can be used in a query. When a query is sent to the storage, the response contains an iterator listing all the objects that fit the query. The iterator returns identifiers of the objects one by one in the ascending order.

Figure 5:
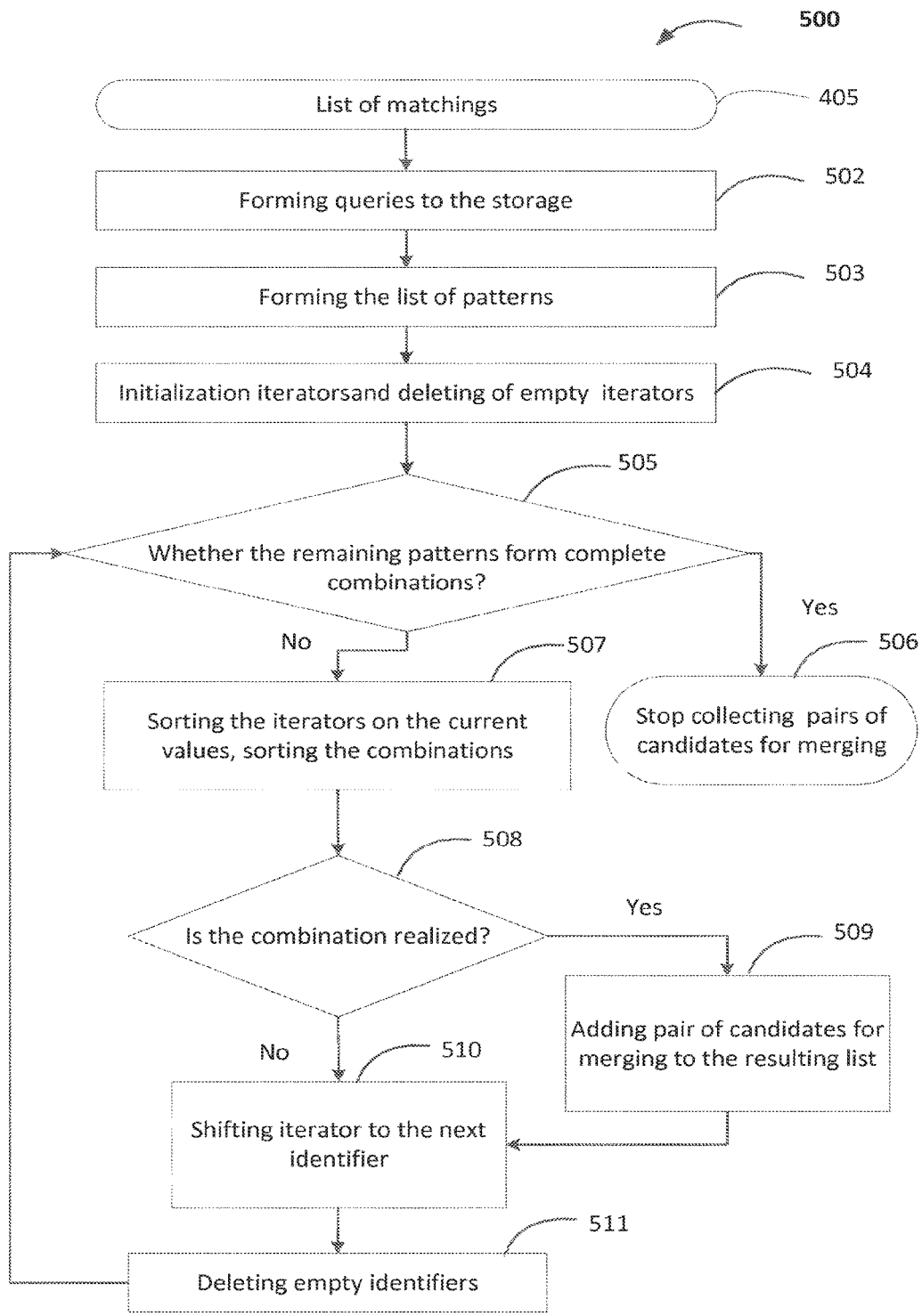
FIG. 5 is a block diagram illustrating a search for combinations of patterns in storage according to an embodiment of the present invention.

FIG. 5 shows a block diagram 500 of one embodiment of searching of patterns and their combinations in the storage. From each pattern on the list of matchings 405 for each information object we form a query to the document storage 502. The request is represented by the same set of triplets as contained in the pattern, but variable that is replaced by its value from the graph of the document.

For the list of formed queries the list of patterns 503 with iterators is generated that point to the identifiers of information objects from the storage that realize the patterns. The combination is considered to be realized if the identifier of an information object is found in all iterators corresponding to the patterns. After the list of patterns is formed, iterators need to be initialized 504. During initialization of the iterator the repository is searched for information objects that realize each template, empty iterators are deleted. Iterator is empty when in the storage there is no information object that realizes a corresponding pattern.

Then, we check whether the remaining patterns form a complete combination 505. If not, then there is no information object in the storage that was found in the document, and we can stop the process of finding pairs of candidates for merging 506. If, however, from the remaining list of patterns, we can form a combination, than we can start searching for candidates.

The process begins with sorting of iterators by their identification values. In an ordered list of patterns we identify the first and the last iterator for each combination. Then the minimum combination is selected. Minimum combination is a combination in which the index of the last iterator in an ordered list of patterns is minimal. Next it should be checked whether the combination of patterns was realized 508. The combination is realized, as previously mentioned, if all its patterns got the same information object.

This condition is sufficient to check for the first and the last iterator of the combination. If the minimum combination is not realized, we should make the shift to the next iterator identifier 510, and in this case it is necessary to move the first iterators to the identifier which is the current value of the last iterator of not realized minimum combination. If the minimum combination is realized, then a pair of <source object of combinations, found identifier> is added in the resulting list of pairs of candidates for merging 509. Next the other combinations are viewed, and checked that the resulting pair of candidates for merging is also realized in other combinations. Then we proceed to step 510, but in this case the first iterators are shifted to the identifier equal to the current value of the last iterator of minimum combination plus one. After shifting the iterators, some lists of patterns may become empty, empty iterators are removed from the list 511, and then we return to step 505.

Figure 5A:
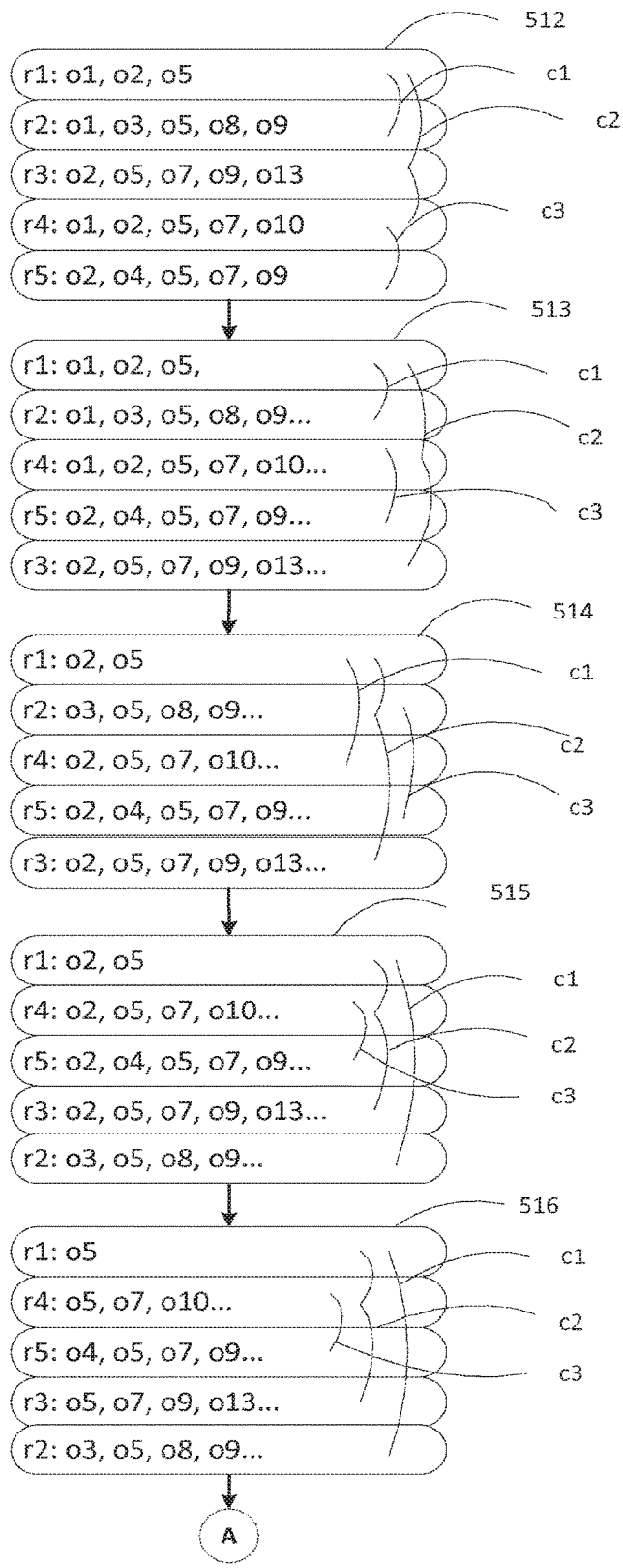
FIG. 5A is illustration of example of a search for combinations of patterns in a storage according to an embodiment of the present invention.
Figure 5B:
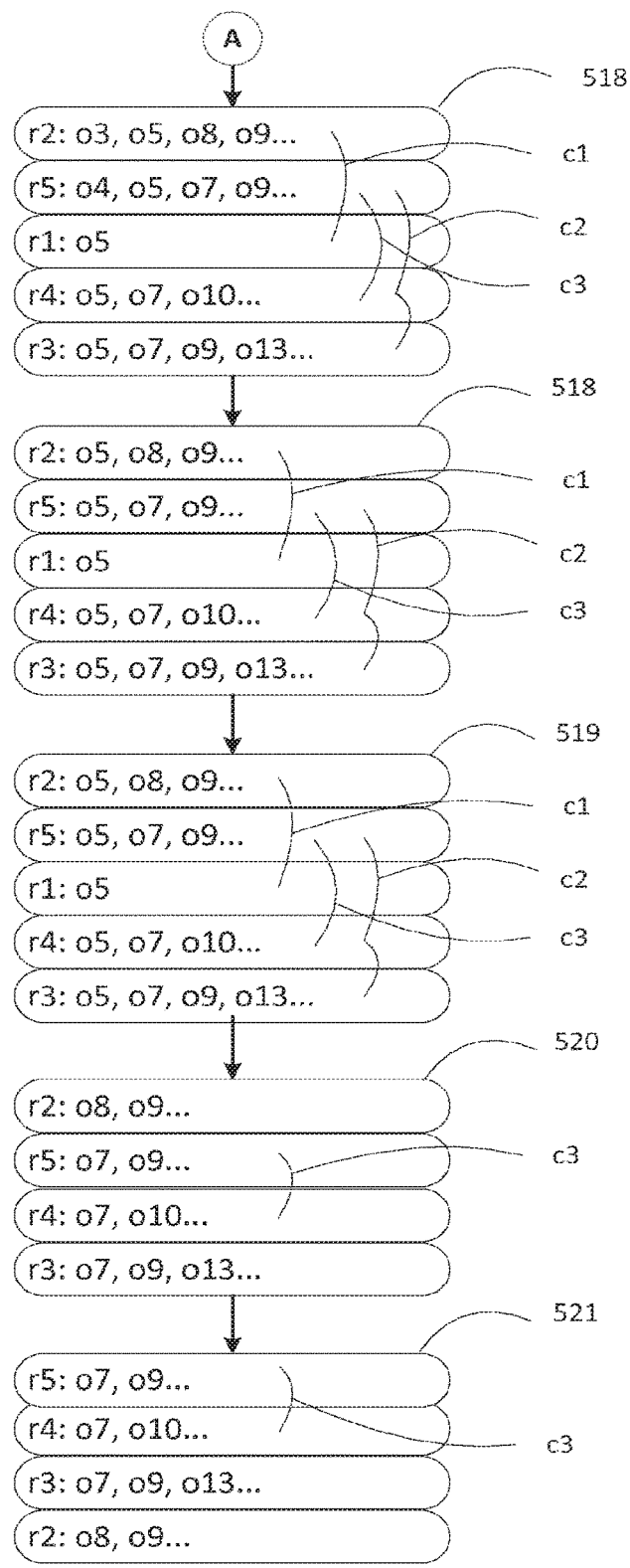
FIG. 5B is illustration of example of a search for combination of patterns in a storage according to an embodiment of the present invention.

An example of searching combinations of patterns in the storage is illustrated in FIG. 5A and FIG. 5B. Suppose that further 5 patterns (r1, r2, r3, r4, r5) have been found in the document. They are incorporated in the following combinations: c1={r1, r2}, c2={r1, r3, r4}, c3={r4, r5}. Items 512-521 in FIGS. 5A-B denote the consecutive stages of search, r1, r2, r3, r4, r5 denote pattern numbers, which corresponds to an iterator, o1, o2, o3 correspond to object identifiers that satisfy the queue, according to which the iterator are obtained. Fragment 512 corresponds to the step of initialization of iterators, e.g. it is shown that r1 corresponds to objects with identifiers o1, o2, o5, and r2 corresponds to objects with identifiers o1, o3, o5, o8, o9 etc. Accordingly, the pattern r5 corresponds to objects with identifiers o2, o4, o5, o7, o9. Arcs show possible combinations of patterns c1={r1, r2}, c2={r1, r3, r4}, c3={r4, r5}.

Fragment 513 illustrates the step of sorting iterators on the current values of objects' identifiers to which they point. In fragment 513 combination c1 is checked first. It is the minimum combination for this sorting of iterators: on the first local position (r1) and the last local position (r2) of this combination there is an object with identifier o1, i.e., the object with identifier 1 simultaneously realizes patterns r1 and r2, and therefore the complete combination is realized for this object. Further, the combination c2 is checked: on its first local position (r1) there is again an object with identifier o1, on its last local position (r4) there is an object with identifier o2. This means that the combination c2 is not realized, while the identifier of the object at the iterator 4 shouldn't be taken into account. After a minimum combination is realized the identifier of the object for which this combination is realized should be removed, and the iterators must be shifted to a value not less than 1+1=2. Fragment 514 depicts iterators after the shift. In fragment 515 the resulting iterators are sorted by the identifiers value. Minimum combination at this time is combination c3, it is realized by the subject with identifier o2. Combination c2 is also realized, and combination c1 is not. In fragment 516 first iterators are shifted to a value of 2+1=3. In fragment 517, after sorting of iterators, minimum combination c1 is identified as not realized. This means that iterators should be shifted. In fragment 518 iterators are shifted to the identifier o5. In fragment 519 iterators are sorted, and all combinations are realized, the iterators are shifted to the identifier following the object o5 in pattern r1. There are no more information objects in pattern r1, and therefore the combinations c1 and c2 can no longer be realized. Therefore, as shown in fragment 521, further search will be made only for combination c3. The searching process stops when for every combination there are no more information objects that realize at least one pattern of this combination.

Figure 6:
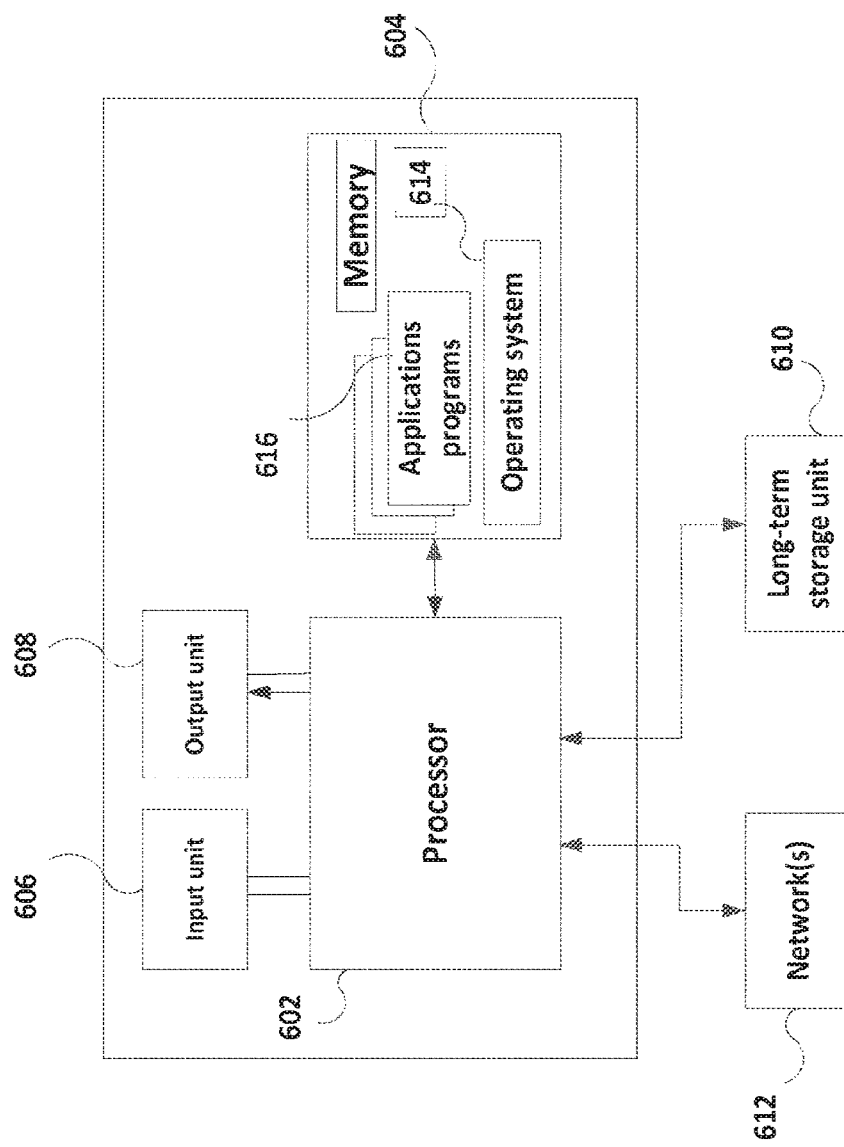
FIG. 6 is a schematic depiction of a system according to an embodiment of the present invention.

FIG. 6 shows exemplary hardware for implementing the techniques and systems described herein, in accordance with one implementation of the present disclosure. Referring to FIG. 6, the exemplary hardware includes at least one processor 602 coupled to a memory 604. The processor 602 may represent one or more processors (e.g. microprocessors), and the memory 604 may represent random access memory (RAM) devices comprising a main storage of the hardware, as well as any supplemental levels of memory, e.g., cache memories, non-volatile or back-up memories (e.g. programmable or flash memories), read-only memories, etc. In addition, the memory 604 may be considered to include memory storage physically located elsewhere in the hardware, e.g. any cache memory in the processor 602 as well as any storage capacity used as a virtual memory, e.g., as stored on a mass storage device 610.

The hardware also typically receives a number of inputs and outputs for communicating information externally. For interface with a user or operator, the hardware\ may include one or more user input devices 606 (e.g., a keyboard, a mouse, imaging device, scanner, microphone) and a one or more output devices 608 (e.g., a Liquid Crystal Display (LCD) panel, a sound playback device (speaker)). To embody the present invention, the hardware typically includes at least one screen device.

For additional storage, the hardware may also include one or more mass storage devices 610, e.g., a floppy or other removable disk drive, a hard disk drive, a Direct Access Storage Device (DASD), an optical drive (e.g. a Compact Disk (CD) drive, a Digital Versatile Disk (DVD) drive) and/or a tape drive, among others. Furthermore, the hardware 1400 may include an interface with one or more networks 612 (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces between the processor 602 and each of the components 604, 606, 608, and 612 as is well known in the art.

The hardware operates under the control of an operating system 614, and executes various computer software applications, components, programs, objects, modules, etc. to implement the techniques described above. Moreover, various applications, components, programs, objects, etc., collectively indicated by application software 616 in FIG. 6, may also execute on one or more processors in another computer coupled to the hardware via a network 612, e.g. in a distributed computing environment, whereby the processing required to implement the functions of a computer program may be allocated to multiple computers over a network.

In general, the routines executed to implement the embodiments of the invention may be implemented as part of an operating system or a specific application, component, program, object, module or sequence of instructions referred to as a "computer program." A computer program typically comprises one or more instruction sets at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally to actually effect the distribution regardless of the particular type of computer-readable media used. Examples of computer-readable media include but are not limited to recordable type media such as volatile and non-volatile memory devices, floppy and other removable disks, hard disk drives, optical disks (e.g., Compact Disk Read-Only Memory (CD-ROMs), Digital Versatile Disks (DVDs), flash memory, etc.), among others. Another type of distribution may be implemented as Internet downloads.

Aspects of the present disclosure have been described above with respect to techniques for machine interpretation of information in text documents. However, it has been contemplated that portions of this disclosure may, alternatively or additionally, be implemented as separate program products or elements of other program products.

All statements, reciting principles, aspects, and embodiments of the disclosure and specific examples thereof are intended to encompass both structural and functional equivalents of the disclosure.

It will be apparent to those skilled in the art that various modifications can be made in the devices, methods, and program products of the present disclosure without departing from the spirit or scope of the disclosure. Thus, it is intended that the present disclosure includes modifications that are within the scope thereof and equivalents.

What is claimed is:

1. A method comprising:
   identifying matching pairs of one or more information objects corresponding to a real world object, one information object from a document and at least one information object from a document storage for a combination of global identification patterns that exist in the document and in the document storage;
   ascertaining consistency of the matching pairs and determining which of the one or more information objects in the document are suitable for merging into the document storage; and
   adding the one or more information objects from the document to the document storage to associate information objects corresponding to the real world object.

2. The method of claim 1, further comprising:
   prior to identifying the matching pairs, searching for the global identification patterns and for the combination of the global identification patterns in the document and searching for the global identification patterns and their combinations in the document storage.

3. The method of claim 1, wherein adding the one or more information objects from the document to the document storage further comprises adding one or more features of the one or more information objects in the document to the document storage if the one or more feature is absent from the document storage and if the one or more information objects in the document and in the document storage correspond to the real world object.

4. The method of claim 1, wherein adding the one or more information objects from the document to the document storage further comprises adding one or more information objects from the document to the document storage as new information objects if the one or more information objects in the document storage do not have one or more information objects in the document storage corresponding to the real world object.

5. The method of claim 1, wherein the global identification patterns correspond to features of the real world object.

6. The method of claim 1, wherein the one or more information objects correspond to one or more of a mention, a name, or a reference to the real world object in a natural language.

7. The method of claim 1, wherein ascertaining consistency of the matching pairs further comprises ascertaining consistency of features of the one or more information objects with ontology.

8. The method of claim 7, wherein consistency of features indicates that merging the one or more information objects does not violate cardinality of relations between the one or more information objects.

9. The method of claim 1, further comprising computing weights of each pattern of the combination and generating a unicity parameter and a specialty parameter for the combination.

10. The method of claim 9, further comprising determining reliability of the combination of global identification patterns based on one or more of the weights, unicity parameter, or the specialty parameter.

11. The method of claim 10, wherein determining the reliability further comprises identifying a set of global identification patterns having a sum of the weights of each of the global identification patterns that exceed a predetermined threshold.

12. A system comprising:
   a memory; and
   a processor, coupled to the memory, the processor to:
      identify matching pairs of one or more information objects corresponding to a real world object, one information object from a document and at least one information object from a document storage for a combination of global identification patterns that exist in the document and in the document storage;
      ascertain consistency of the matching pairs and determining which of the one or more information objects in the document are suitable for merging into the document storage; and
      add the one or more information objects from the document to the document storage to associate information objects corresponding to the real world object.

13. The system of claim 12, wherein the processor is further to:
   prior to identifying the matching pairs, search for the global identification patterns and for the combination of the global identification patterns in the document and search for the global identification patterns and their combinations in the document storage.

14. The system of claim 12, wherein to ascertain consistency of the matching pairs, the processor is further to ascertain consistency of features of the one or more information objects with ontology.

15. The system of claim 14, wherein consistency of features indicates that merging the one or more information objects does not violate cardinality of relations between the one or more information objects.

16. The system of claim 12, wherein the processor is further to:
   compute weights of each pattern of the combination; and
   generate a unicity parameter and a specialty parameter for the combination.

17. The system of claim 16, wherein the processor is further to:
   determine reliability of the combination of global identification patterns based on one or more of the weights, unicity parameter, or the specialty parameter.

18. The system of claim 17, wherein to determine the reliability, the processor is further to:
identify a set of global identification patterns having a sum of the weights of each of the global identification patterns that exceed a predetermined threshold.

19. A computer-readable non-transitory storage medium comprising executable instructions that, when executed by a processing device, cause the processing device to:
identify matching pairs of one or more information objects corresponding to a real world object, one information object from a document and at least one information object from a document storage for a combination of global identification patterns that exist in the document and in the document storage;
ascertain consistency of the matching pairs and determining which of the one or more information objects in the document are suitable for merging into the document storage; and
add the one or more information objects from the document to the document storage to associate information objects corresponding to the real world object.

20. The computer-readable non-transitory storage medium of claim 19, wherein the processing device is further to:
prior to identifying the matching pairs, search for the global identification patterns and for the combination of the global identification patterns in the document and search for the global identification patterns and their combinations in the document storage.

* * * * *